(12) United States Patent
Kim et al.

(10) Patent No.: US 9,339,730 B2
(45) Date of Patent: May 17, 2016

(54) METHOD, SERVER, TERMINAL, AND RECORDING MEDIUM FOR PROVIDING GAME

(75) Inventors: Jeong Hun Kim, Seoul (KR); Seung Cheol Kang, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 103 days.

(21) Appl. No.: 14/343,977

(22) PCT Filed: Jan. 13, 2012

(86) PCT No.: PCT/KR2012/000330
§ 371 (c)(1),
(2), (4) Date: Mar. 10, 2014

(87) PCT Pub. No.: WO2013/035944
PCT Pub. Date: Mar. 14, 2013

(65) Prior Publication Data
US 2014/0221103 A1     Aug. 7, 2014

(30) Foreign Application Priority Data

Sep. 8, 2011    (KR) .................. 10-2011-0091129

(51) Int. Cl.
*A63F 9/24*     (2006.01)
*A63F 13/30*    (2014.01)
*G07F 17/32*    (2006.01)

(52) U.S. Cl.
CPC .............. *A63F 13/12* (2013.01); *G07F 17/32* (2013.01); *A63F 2300/303* (2013.01)

(58) Field of Classification Search
CPC ............ A63F 13/12; A63F 2300/5553; A63F 2300/575; A63F 2300/807
See application file for complete search history.

(56) References Cited

FOREIGN PATENT DOCUMENTS

| JP | 2003225459 A | 8/2003 |
|---|---|---|
| JP | 2007252546 A | 10/2007 |
| JP | 2009254448 A | 11/2009 |
| KR | 100916482 A | 9/2009 |

OTHER PUBLICATIONS

World of Warcraft Wiki, Aug. 30, 2010, at http://WowWiki.wikia.com/wiki, pp. 1-7.*
"Wow Simple Manual for Beginner, Part 1," Naver Blog, Sep. 21, 2008, see pp. 3-4, (http://blog.naver.com/w2jihee?Rediret=Log&logNo=140126334016), 12 pages.
English language translation of International Search Report issued in corresponding PCT Application No. PCT/KR2012/000330 on Oct. 4, 2012, 3 pages.
English language translation of International Preliminary Report on Patentability issued in corresponding PCT Application No. PCT/KR2012/000330 on Mar. 12, 2014, 13 pages.

* cited by examiner

*Primary Examiner* — Steve Rowland
(74) *Attorney, Agent, or Firm* — Sughrue Mion, PLLC

(57) ABSTRACT

The present invention relates to a game. More particularly, the present invention relates to a method, a server, a terminal, and a recording medium for proving a game having a function of enabling a user to easily recognize an item value of an item when the item usable within a game is displayed on a game screen.

20 Claims, 11 Drawing Sheets

FIG. 6

METHOD, SERVER, TERMINAL, AND RECORDING MEDIUM FOR PROVIDING GAME

CROSS REFERENCE TO RELATED APPLICATIONS

This application is a 35 U.S.C. §371 National Phase Entry Application from PCT/KR2012/000330, filed Jan. 13, 2012, and designating the United States, which claims priority under 35 U.S.C. §119 to Korean Patent Application No. 10-2011-0091129 filed Sep. 8, 2011, which is incorporated herein in its entirety.

TECHNICAL FIELD

A game technology is provided.

BACKGROUND ART

The existing game provides an interface such as an item shop where a user obtains a new character or equipment to improve character capability.

The user purchases and obtains desired items among several items posted on the item shop, and the like, in which item information such as character information and equipment information is defined in the items posted on the item shop, and the like and therefore the user estimates how large the effect of the corresponding item including the item information is in the game to purchase the corresponding item.

In this case, there is a problem in that it is difficult to understand how large the item value of the corresponding item is, that is, how large the effect of the corresponding item is in the game based on the item information of the items posted on the item shop, and the like.

Meanwhile, all the items purchased by the user are items in which the item information is fixed in advance. According to a method for obtaining only the fixed item, when the user intends to obtain the item having the desired fixed item information, there is a problem in that much purchase costs may be required at the time of purchasing the item information having a high item value.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to enable a user to easily recognize an item value of an item when the item usable within a game is displayed on a game screen.

Further, the present invention has been made in an effort to provide a function of providing an unfixed item in which item information is not fixed, not a fixed item in which item information is fixed in advance and obtaining an item having the fixed item information from the unfixed item.

Technical Solution

An exemplary embodiment of the present invention provides a server for providing a game, including: an item value determination unit configured to determine an item value of an acquired item; an item color determination unit configured to determine a color representing the determined the item value; and an item display control unit configured to control a display of the item on a game screen depending on the determined color.

An exemplary embodiment of the present invention provides a method for providing a game by a server, including: determining an item value of an acquired item; determining a color representing the determined item value; and controlling a display of the item on a game screen depending on the determined color.

An exemplary embodiment of the present invention provides a server for providing a game, including: an item purchase unit configured to perform item purchase processing on an item having unfixed item information depending on a predetermined purchase price; an item information fixing unit configured to fix the item information on the item to enable the item to be used within the game; and an item acquisition processing unit configured to add the item having the fixed item information to a list of an acquired item.

An exemplary embodiment of the present invention provides a server for providing a game, including: an item value determination unit configured to determine an item value for an item; an item value index determination unit configured to determine an item value index representing the determined item value; and an item display control unit configured to control a display of the item on a game screen depending on the determined item value index.

An embodiment of the present invention provides a terminal for providing a game, including: a control unit configured to determine an item value of an acquired item, determine a color representing the determined item value, and control a display of the item on a game screen depending on the determined color; and a display configured to output the game screen.

An exemplary embodiment of the present invention provides a method for providing a game by a terminal, including: an acquiring item; determining an item value of the item; determining a color representing the determined item value; and controlling a display of the item on a game screen depending on the determined color.

An exemplary embodiment of the present invention provides a computer readable recording medium recorded with a program for executing a method for providing a game, wherein the program implement a function of determining an item value of an acquired item; a function of determining a color depending on the determined item value; and a function of controlling a display of the item on a game screen depending on the determined color.

Advantageous Effects

As set forth above, according to the exemplary embodiments of the present invention, it is possible for the user to easily recognize the item values of the items when the items usable within a game are displayed on the game screen.

Further, according to the exemplary embodiments of the present invention, it is possible for the user to feel curiosity and fun about whether the item having any fixed item information is obtained from the unfixed item, by providing the function of providing the unfixed item in which the item information is not fixed, not the fixed item in which the item information is fixed in advance and obtaining the item having the fixed item information from the unfixed item.

DESCRIPTION OF THE DRAWINGS

FIG. 6 is an exemplified diagram of an item conversion process of an exceptional unfixed item and a general unfixed item which are two kinds of unfixed items, in a game according to the exemplary embodiment of the present invention.

MODE FOR INVENTION

Figure 1:
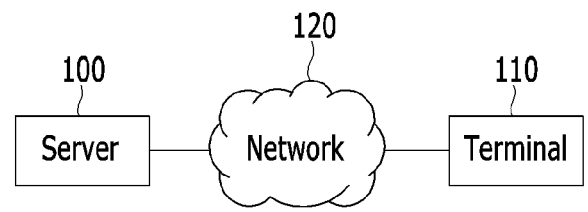
FIG. 1 is a diagram schematically illustrating a system for providing a game according to an exemplary embodiment of the present invention.

A game according to exemplary embodiments of the present invention provides a function of allowing a user to easily recognize item values when the items usable within the game are displayed on a game screen.

To allow the user to easily recognize the item values when the items are displayed on the game screen, the items may be displayed using "item value indexes" such as a color, a shape, and a size which represent the item values. For example, items having different item values may be displayed by different colors, different shapes, or different sizes.

Further, in the game according to the exemplary embodiment of the present invention, the item values may be fixed information, but may also be information having variability which is updated periodically or updated in real time depending on market price information of the corresponding item.

Further, in the game according to exemplary embodiment of the present invention, the market price information used to determine the item values may be, for example, auction house market price information on each item in an auction house within the game Further, in the game according to exemplary embodiment of the present invention, an unfixed item in which the item information is unfixed may be acquired, in addition to a general item (fixed item) in which item information which may include character information on characters (for example, player, and the like) within the game, information on equipment used by the characters, and the like is fixed. Here, the item information may have relevancy with the item values. For example, as a capability numerical value of the character included in the character information is increased in the item information, the item value of the corresponding item may also be increased.

The game according to the exemplary embodiment of the present invention may be an online game which is played in a terminal communicating with a server or may be a standalone game which is executed by only the terminal without being associated with the server.

In the case of the online game, the function of displaying item values, the function of updating and managing market price information therefor as described above, and the like may also be performed by the server and may also be performed by applications installed in the terminal by being co-operated with the server. In the case of the standalone game, the function of displaying item values, the function of updating and managing market price information therefor as described above, and the like may also be executed by the applications installed in the terminal without being co-operated with the server.

Hereinafter, a game according to exemplary embodiments of the present invention will be described with reference to the accompanying drawings. In adding reference numerals to components of each drawing, even though the same components are illustrated in different drawings, it is to be noted that these components are denoted by the same reference numerals if possible. In describing exemplary embodiments of the present invention, well-known functions or constructions will not be described in detail since they may unnecessarily obscure the understanding of the present invention.

In addition, in describing components of the present specification, terms such as first, second, A, B, (a), (b), etc. may be used. These terms are used only to differentiate the components from other components. Therefore, the nature, times, sequence, etc. of the corresponding components are not limited by these terms. When a component is "connected", "coupled", or "linked" to another component, it is to be understood that the component may be directly connected or linked to the other component, but the component may be "connected", "coupled", or "linked" to the other component via another component therebetween.

FIG. 1 is a diagram schematically illustrating a system for providing a game according to an exemplary embodiment of the present invention.

Referring to FIG. 1, a system for providing a game according to an exemplary embodiment of the present invention includes a server 100 for controlling corresponding game to be played in a terminal 110, terminals 110 to allow a user to actually play the game, and the like.

The terminals 110 may be downloaded and installed with game-related programs (applications) from the server 100 to play a game, may execute the game-related programs to play a game while communicating with the server 100, and may play the game only by communicating with the server 100 without being downloaded with the game-related programs from the server 100.

The server 100 is connected to the terminals 110 and may provide pages on the corresponding web site to the connected terminals 110. Further, the server 100 performs a membership procedure and thus stores and manages various types of information of users joined as a member and may also provide a function of purchasing and settling various types of game related items (for example, characters, apparatuses, function items, and the like).

Further, the server 100 may also relay execution data of the game applications executed by each of the terminals 110 in real time so as to be able to allow users to execute a game battle.

Considering a hardware construction, the server 100 has the same configuration as a general web server or WAP server. However, considering a software construction, the server 100 includes a program module which is implemented by other languages such as C, C++, Java, Visual Basic, and Visual C and executes various functions.

Further, the server 100 means a computer system which is generally connected to a plurality of unspecified clients (including terminals 110) and/or other servers via a network 120 such as the Internet, receives a job execution request from the clients or other web servers, and derives and provides job results therefor, and computer software (server program) installed therefor.

Further, in addition to the above-mentioned server programs, the server 100 is to be understood as a broad concept including a series of application programs executed on the server 100 and in some cases, various types of databases (hereinafter, referred to as "DB") which are constructed inside or outside. Therefore, the server 100 classifies the membership information and various types of information and data on games for each kind of games and stores and manages the classified information and data in the DB, in which the DB may be implemented inside or outside the server DB.

Further, the server 100 may be implemented using the server programs which are variously provided depending on operating systems such as DOS, windows, Linux, UNIX, and Macintosh in hardware for a general server and as the representative server programs, a website and an internet information server (IIS) used in the windows environment and CERN, NCSA, APPACH, etc., used in the UNIX environment, and the like may be used.

Further, the server 100 may be co-operated with an authentication system and a settlement system for user authentication of a game user or purchase and settlement of items in a game, etc.

The terminal 110 connected with the server 100 via the network 120 is generally a personal PC; however, if the terminal is connected to the wired and wireless based network 120 to enable server-client communication with the server 100, any terminal may be used and the terminal is a broad concept including any communication computing device such as a smart phone, a laptop computer, a mobile communication terminal, a personal digital assistant (PDA), and a game machine.

The network 120 is a network which connects the server 100 to the terminals 110 and may be a closed network such as a local area network (LAN) and a wide area network (WAN) but is preferably an opened network such as Internet. The Internet means a universal opened computer network architecture which provides a TCP/IP protocol and several services existing on the upper layer, that is, a hypertext transfer protocol (HTTP), Telnet, a file transfer protocol (FTP), a domain name system (DNS), a simple mail transfer protocol (SMTP), a simple network management protocol (SNMP), a network file service (NFS), and a network information service (NIS). Further, in the case in which the terminal 110 is a mobile communication terminal or a mobile terminal such as a smart phone, the network 120 may also include wireless networks such as a mobile communication network and a WiFi network.

Figure 2:
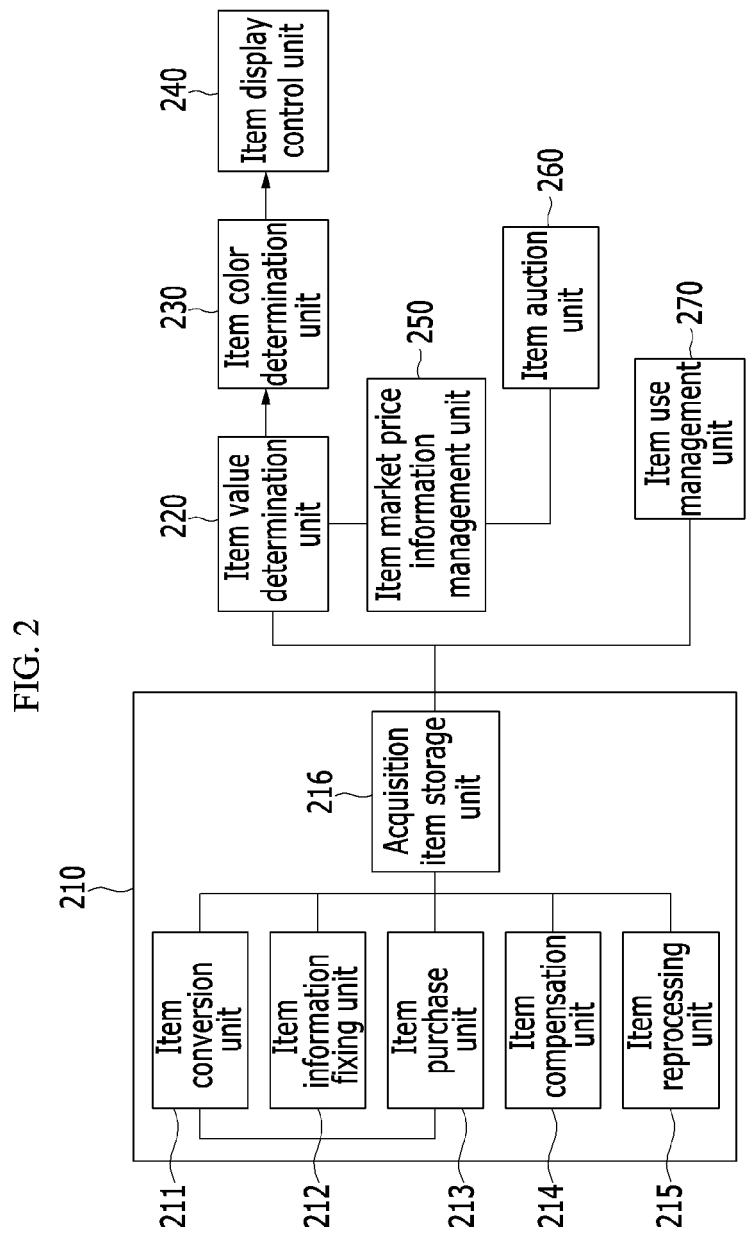
FIG. 2 is a block diagram of a server for providing a game according to an exemplary embodiment of the present invention.

FIG. 2 is a block diagram of a server 100 for providing a game according to an exemplary embodiment of the present invention.

Referring to FIG. 2, the server 100 for providing a game according to the exemplary embodiment of the present invention includes an item value determination unit 220 which determines item values of acquired items, an item color determination unit 230 which determines colors representing the determined item values, an item display control unit 240 which controls a display of the items on a game screen in response to the determined colors, and the like.

The above-mentioned item value determination unit 220 determines the item values of items if determination events for the item values of items are generated and confirms the market price information on the corresponding item when the determined events are generated and determines the confirmed market price information as the item values of items, by referring to the market price information on each item which is updated at each predetermined period or updated in real time.

As described above, since the market price information on the items is updated at a predetermined period or updated in real time, the determined item values may also be changed each time the item values are determined.

As illustrated in FIG. 2, the server 100 for providing a game according to the exemplary embodiment of the present invention may further include an item market price information management unit 250 which manages the market price information used to determine the item values.

The item market price information management unit 250 may read, for example, the auction house market price information on each item at each predetermined period or in real time and store and manage the read auction house market price information as the market price information. That is, the market price information used as the item values may be the auction house market price information on the corresponding item in the auction house within a game.

Therefore, as illustrated in FIG. 2, the server 100 for providing a game according to the exemplary embodiment of the present invention may further include an item auction unit 260 which provides the auction house within a game function to generate the auction house market price information and stores and manages the auction house market price information on each item so that the generated auction house market price information may be used as one of the market price information.

The item auction unit 260 may post the auction information on the corresponding item on a game site, a game screen, or the like and then generate the auction house price information in response to received purchase asking price information. In this case, the highest purchase asking price information in at least one purchase asking price information may be defined as the auction house price information.

Meanwhile, the above-mentioned item color determination unit 230 may determine colors corresponding to the determined item values after the item value determination unit 220 determines the item value of the corresponding item. Herein, the colors corresponding to the item values are colors representing the item values.

The item color determination unit 230 may directly determine the colors from the item values and may determine item grades corresponding to the item values and then determine the colors corresponding to the determined item grades as the colors representing the item values.

In the case of the latter determination method, the item color determination unit 230 previously defines and stores the information on the item grades corresponding to each of the plurality of item value ranges, determines the item value range, to which the item values determined by the item value determination unit 220 belongs, among the plurality of item value ranges by referring to the stored information, and determines the item grades corresponding to the determined item value ranges as the item grades of the items.

Next, the item color determination unit 230 may previously define and store the information on colors corresponding to each of the plurality of item grades and determine the colors corresponding to the determined item grades as the colors representing the item values of the items by referring to the stored information.

The method for determining colors representing the item value by the item color determination unit 230 is exemplarily described with reference to FIG. 5.

Figure 5:
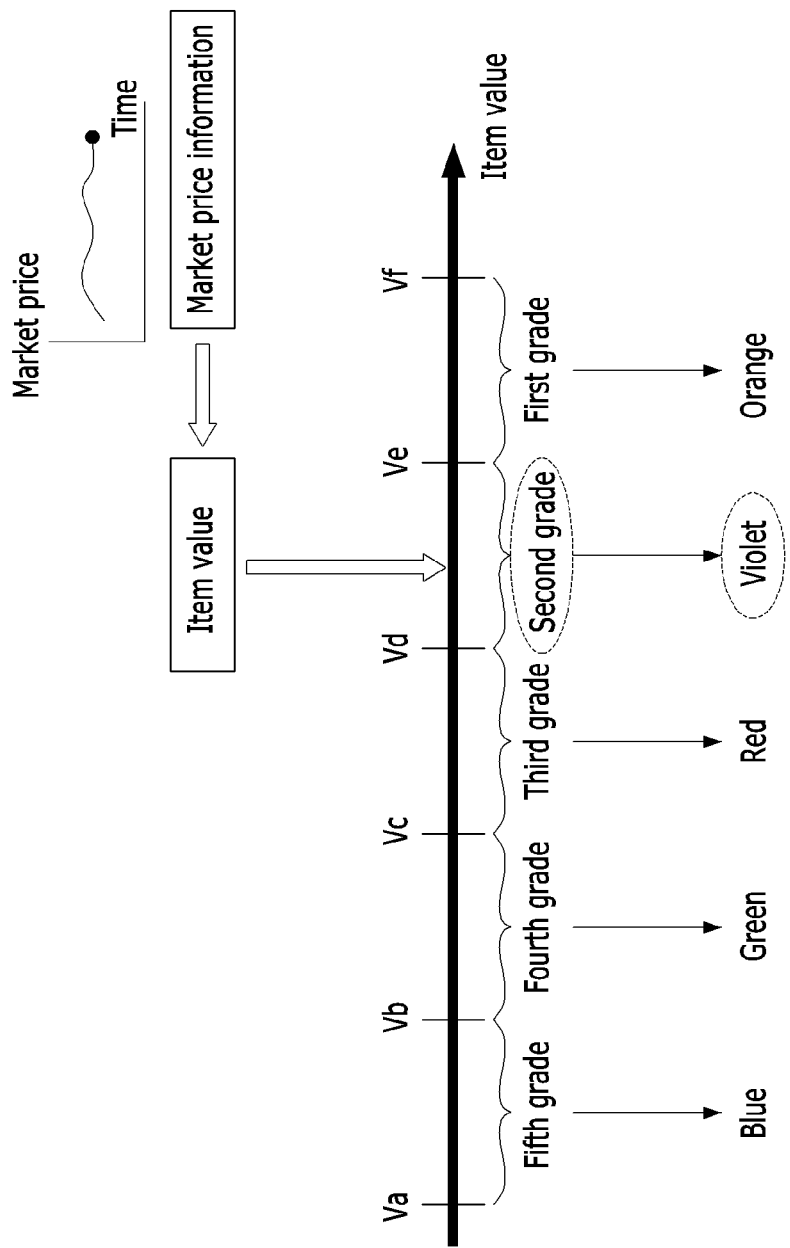
FIG. 5 is a diagram for describing a method for determining colors representing item values of items, in a game according to the exemplary embodiment of the present invention.

FIG. 5 is a diagram for describing a method for determining colors representing the item values of the items, in the game according to the exemplary embodiment of the present invention.

Referring to FIG. 5, the item value determination unit 220 determines the item value of the acquired item based on the confirmation of the market price information on the acquired item and then the item color determination unit 230 determines the value range, to which the determined item value belongs, among a fifth value range Va-Vb, a fourth value range Vb-Vc, a third value range Vc-Vd, a second value range Vd-Ve, and a first value range Ve-Vf as the second value range Vd-Ve.

Next, the item color determination unit 230 refers to the information on the item grades corresponding to each of the value ranges to determine the item grade corresponding to the determined second value range Vd-Ve as a second grade.

Next, the item color determination unit 230 refers to the information on the colors corresponding to each of the item grades to determine the color corresponding to the second grad which is the determined item grade as violet.

Meanwhile, the above-mentioned item display control unit 240 uses the determined color to represent the item value of the corresponding item, that is, to enable the user to easily and intuitively recognize the item value of the corresponding item. In this case, the item display control unit 240 may display the entire or partial region of the item displayed on the game screen as the determined color.

Meanwhile, the item having the item value determined by the above-mentioned item value determination unit 220 is an item acquired by a predetermined method and is a fixed item in which the specific item information is fixed.

Herein, "the item information is fixed in the item" may mean the state that the item may be directly used in the game. Further, the "item information" may include, for example, character information (for example, information on character name, character ability value, experience value, level, and the like) on characters controlled by the user within the game, equipment information on equipment used by a character, or the like and may be a critical factor determining the item values.

The server 100 for providing a game according to the exemplary embodiment of the present invention may further include a related component to acquire items prior to determining the item values, that is, an item acquisition unit 210.

The item acquisition unit 210 acquires the corresponding item by performing an item acquisition procedure; in this case, the "acquiring the items" may mean that identification information on the corresponding item is added to a list of the acquired items (a list of the identification information on the items) stored in an item list storage unit 216 while being linked to the corresponding user information in terms of the data processing and may mean that the corresponding user may use the corresponding item within a game in terms of the user.

Figure 3:
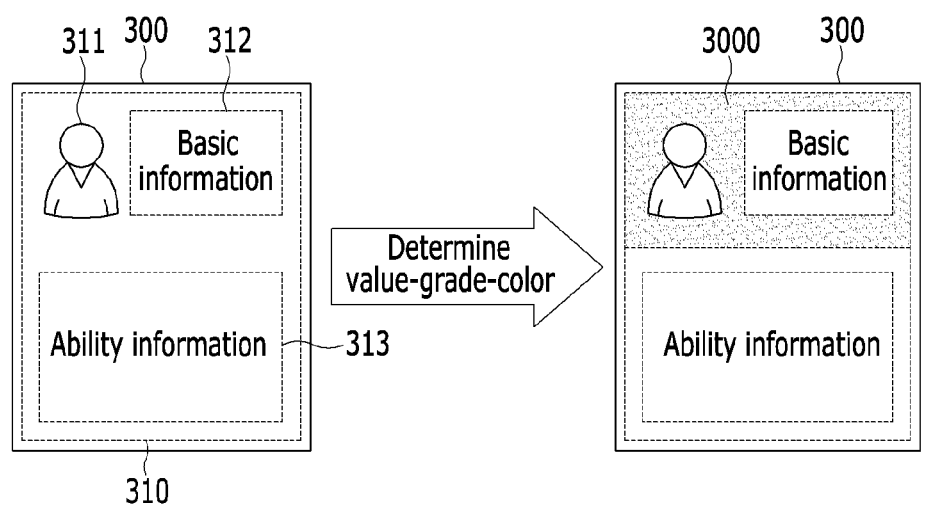
FIG. 3 is a diagram illustrating an example of controlling a display of items depending on item values of items, in a game according to the exemplary embodiment of the present invention.

FIG. 3 is a diagram illustrating an example of controlling a display of an item 300 depending on an item value of the item 300 acquired by the item acquisition unit 210, in the game according to the exemplary embodiment of the present invention.

Referring to FIG. 3, the item 300 acquired by the item acquisition unit 210 is displayed on the game screen. In this case, the fixed specific item information is also displayed in the item 300 together.

Referring to FIG. 3, the fixed specific item information is displayed in an information display region 310 within a display region of the item 300 and character information including, for example, a character image 311, character basic information 312 such as a character name or level of a character, and ability information 313 on a character, and the like may be displayed in the information display region 310.

Referring to FIG. 3, after the item values of the acquired items are determined by the item value determination unit 220, and the colors representing the item values are determined by the item color determination unit 230, the item display control unit 240 may display a determined color 3000 in the entire display region or a partial display region of the item 300. FIG. 3 illustrates the case in which the determined color 300 is displayed in a part of the region.

Meanwhile, when the above-mentioned item acquisition unit 210 acquires the item 300 having the fixed specific item information by performing the item acquisition procedure acquiring the item 300, the item acquisition unit 210 adds and stores the acquired item 300 to the list of the acquired items. In this case, the item information may be stored in the list of the acquired items together and at least one of the determined item value, item grades, and colors may also be stored in the list of the acquired items together.

The above-mentioned item acquisition unit 210 may acquire the item 300 having the fixed specific item information through several paths (manners).

Figure 4:
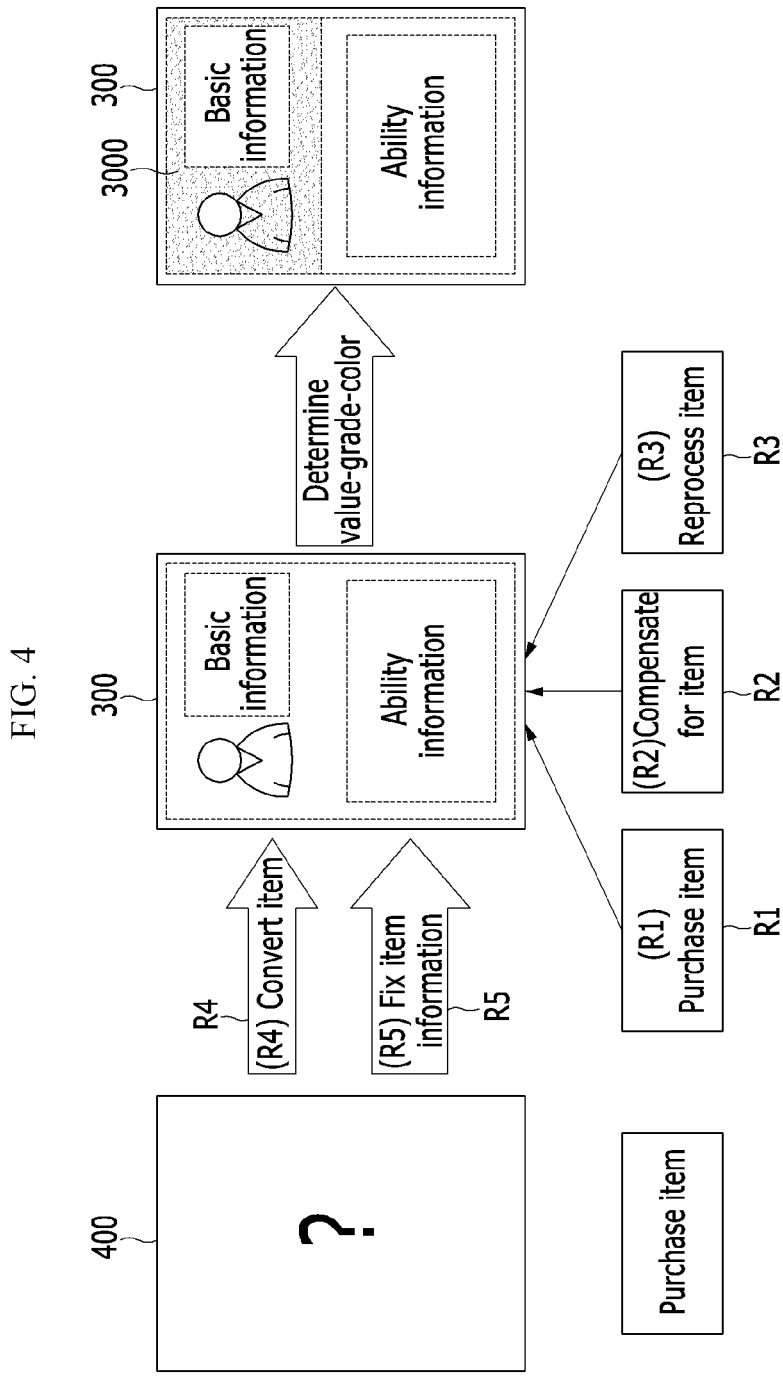
FIG. 4 is a diagram exemplarily illustrating various acquisition paths of an item, in a game according to the exemplary embodiment of the present invention.

FIG. 4 is a diagram exemplarily illustrating various acquisition paths of the item, in the game according to the exemplary embodiment of the present invention.

Referring to FIG. 4, the path through which the item 300 having the fixed specific item information is acquired may include at least one of a path R1 through which the item 300 is acquired by allowing the user to purchase the item 300 having the fixed specific item information among server items posted in an item shop, and the like within a game, a path R2 through which the corresponding item 300 as a compensation for a result obtained by allowing the user to play a game is directly acquired or an item package (so-called "present box") including the corresponding item 300, and the like is acquired and the corresponding item 300 is acquired by opening the acquired item package, and a path R3 through which the corresponding item 300 is acquired by reprocessing at least one of the previously acquired items, and the like.

To provide the above-mentioned item acquisition paths, the item acquisition unit 210 may include at least one detailed configuration among an item purchase unit 213, an item compensation unit 214, an item reprocessing unit 215, and the like, as illustrated in FIG. 2.

As the detailed configuration of the item acquisition unit 210 for providing the item acquisition path R1 among several item acquisition paths by the item purchase, the item purchase unit 213 may perform the item acquisition procedure acquiring the item having the fixed specific item information depending on the item purchase procedure in the item shop, and the like.

Further, as the detailed configuration of the item acquisition unit 210 for providing the item acquisition path R2 among several item acquisition paths by compensating for the items depending on the game result, the item compensation unit 214 may perform the item acquisition procedure directly acquiring the item having the fixed specific item information as the compensation depending on the game result or acquiring the item through the item package.

Further, as the detailed configuration of the item acquisition unit 210 for providing the item acquisition path R3 among several item acquisition paths by reprocessing the item depending on the game result, the item reprocessing unit 215 deletes at least one acquired item from the list of the acquired items depending on the reprocessing request information on at least one acquired item which is included in the list of the acquired items and selected by the user and adds the item having the fixed specific item information to the list of the acquired items by performing the item acquisition procedure acquiring the corresponding item, thereby acquiring the corresponding item.

For example, one or a plurality of acquired items in which the item information including the character information on the character having no longer utility value or having the reduced interest is fixed are deleted from the list of the acquired items and instead, the item having the fixed specific item information including the character information on the character to be newly scouted may be added to the list of the acquired items. Changing the acquired item having the fixed item information to another item having the fixed item information may mean that a newly acquired item is the item in which the acquired item is reprocessed. Therefore, the item acquisition path is called the acquisition path through the item reprocessing and as another expression, may be considered to acquire a new item by reusing the previously acquired item and therefore may also be called the acquisition path through the item reuse.

In connection with the acquisition path through the item reprocessing, the number of items which may be newly acquired depending on the item values or the item grades of at least one acquisition item used to reprocess the item may be limited.

Meanwhile, referring to FIG. 4, the above-mentioned item acquisition path may further include at least one of a path R4 through which the item 300 having the fixed item information is acquired by performing an "item conversion process" on an "unfixed item 400" having the unfixed item information, and a path R5 through which the corresponding item 300 is acquired by fixing the item information on the unfixed item 400 having the unfixed item information, in addition to three acquisition paths R1, R2, and R3 as described above.

To provide the item acquisition path R4 by performing the item conversion process on the above-mentioned unfixed item 400, the item acquisition unit 210 may further include an item conversion unit 211. To provide the item acquisition path R5 by fixing the item information on the unfixed item 400, the item acquisition unit 210 may further include an item information fixing unit 212.

Hereinafter, the item conversion unit 211 and the item information fixing unit 212 will be described in more detail with reference to FIG. 4.

First, the item conversion unit 211 may perform the item acquisition procedure of acquiring the item 300 in which the unfixed item 400 is converted by performing the item conversion processing on the "unfixed item 400" which is purchased with predetermined "unfixed item purchase cost" by the item purchase procedure and has the unfixed item information.

The item 300 in which the unfixed item 400 is converted by the item conversion unit 211 has the specific item information which is fixed by the item conversion processing.

When the conversion request information on the unfixed item 400 is generated as an example of the item conversion processing, the item conversion unit 211 may perform the item acquisition procedure which selects the specific item having the fixed specific item information among the plurality of items and acquires the selected specific item as the item 300 in which the unfixed item is converted.

The item conversion unit 211 controls the selection of the specific item having the fixed specific item information so that the item value of the item 300 is determined to be less than "unfixed item purchase cost", determined to be equal to be the "unfixed item purchase cost", or determined to exceed the "unfixed item purchase cost" by the item value determination unit 220, by referring to the auction house market price information on each item which is generated by the item auction unit 260 and is stored and managed as an example of the market price information by the item market price information management unit 250.

For example, when the user exhausts 100,000 LP (unfixed item purchase cost) from holding game money (unit LP) to purchase the unfixed item 400, and makes the item conversion request for the purchased unfixed item 400, the specific item having the fixed specific item information in which the item value is less than 100,000 LP may be selected and acquired as the item 300 in which the unfixed item 400 is converted. This case corresponds to the case in which the user acquires the item 300 having a lower value than the exhausted game money and thus loses the game money.

As another example, when the user exhausts 100,000 LP (unfixed item purchase cost) from holding game money (unit LP) to purchase the unfixed item 400, and makes the item conversion request for the purchased unfixed item 400, the specific item having the fixed specific item information in which the item value is less than 600,000 LP may be selected and acquired as the item 300 in which the unfixed item 400 is converted. This case corresponds to the case in which the user acquires the item 300 having a larger value with smaller game money to earn the game money.

As another example, when the user exhausts 100,000 LP (unfixed item purchase cost) from holding game money (unit LP) to purchase the unfixed item 400 and makes the item conversion request for the purchased unfixed item 400, the specific item having the fixed specific item information in which the item value is 100,000 LP may be selected and acquired as the item 300 in which the unfixed item 400 is converted. This case corresponds to the case in which the user acquires the item 300 having the same value as the exhausted game money not to lose or earn the game money.

That is, acquiring the item 300 by performing the item conversion process on the unfixed item 400 becomes an item acquisition of a lottery type.

For example, the specific item is stochastically selected in the predetermined condition in which at the time of selecting the specific item, a probability to select the specific item having the fixed specific item information is set to be 20% so that the item value is determined to be less than the "unfixed item purchase cost", a probability to select the specific item having the fixed specific item information is set to be 50% so that the item value is determined to be equal to the "unfixed item purchase cost", a probability to select the specific item having the fixed specific item information is set to be 30% so that the item value is determined to exceed the "unfixed item purchase cost", and thus the selected specific item may be acquired as the item 300 in which the unfixed item 400 is converted.

The user may expect that he/she acquires the item 300 having a higher item value with the small game money, and thus the user may feel other game interest in addition to the interest in the game play.

Meanwhile, the unfixed item 400 may be divided into an "exceptional unfixed item" acquiring the item in which a possible frequency of the item conversion processing is only once but an item value higher than a predetermined level is determined and a "general unfixed item" acquiring the item in which a possible frequency of the item conversion processing is several times but a low item value less than a predetermined level is determined.

In connection with this, the item conversion unit 211 may detect the unfixed item 400 as one of the general unfixed item and the exceptional unfixed item which are divided depending on the possible frequency of the item conversion processing and perform the item conversion processing depending on the detected result.

Figure 6:
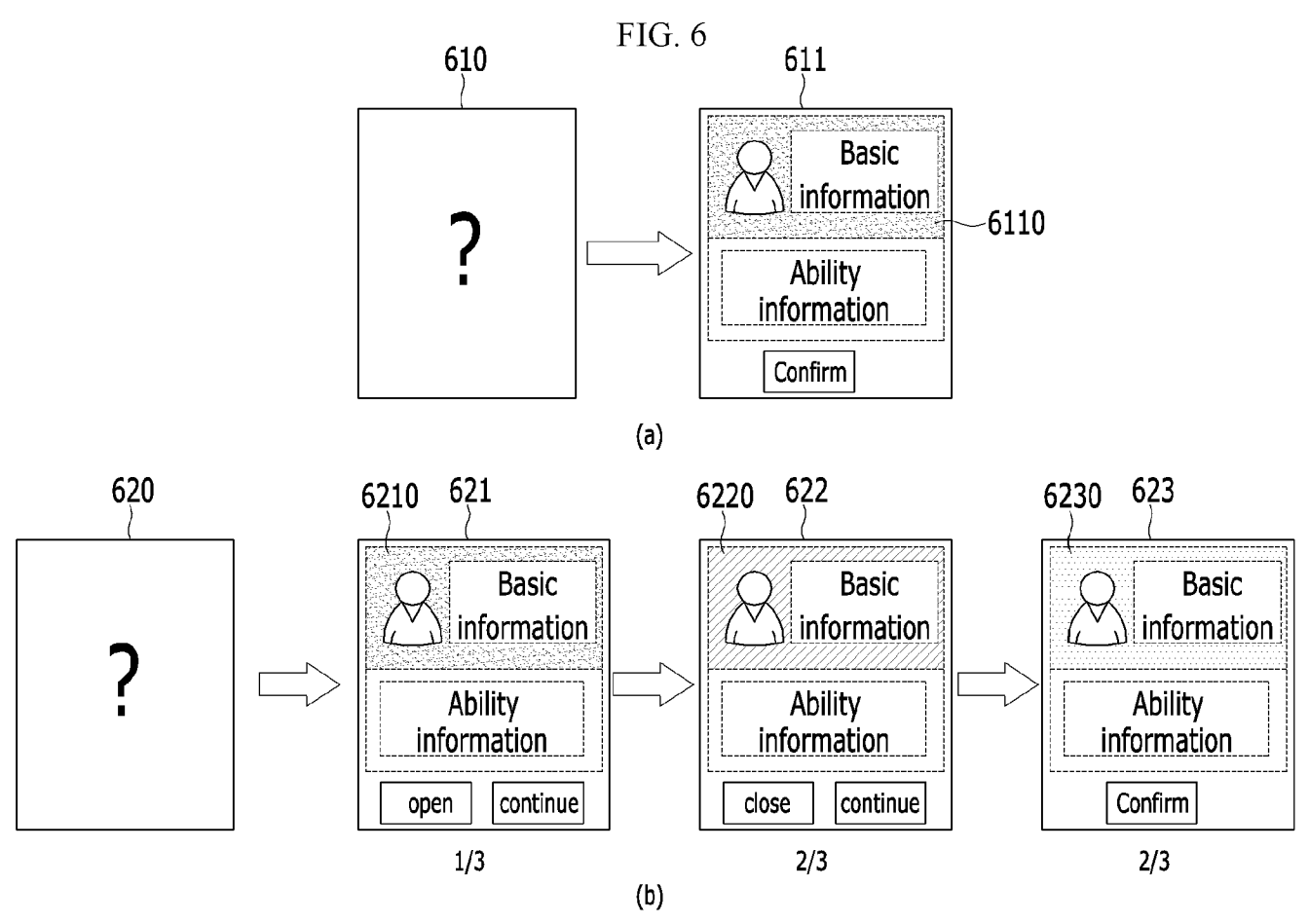

FIG. 6 is an exemplified diagram of an item conversion process of an exceptional unfixed item 610 and a general unfixed item 620 which are two kinds of unfixed items 400, in the game according to the exemplary embodiment of the present invention.

Referring to FIG. 6A, the item conversion unit 211 may acquire only one item 611 having an item value equal to or higher than a predetermined level as an item in which the unfixed item 400 is converted by performing the item conversion processing once when the unfixed item 400 is the exceptional unfixed item 610.

In this case, the acquired item 611 is determined to have the item value equal to or higher than the predetermined level by the item value determination unit 220 and a color 6110 determined by the item color determination unit 230 is a color representing the item value equal to or higher than the predetermined level.

Referring to FIG. 6B, the item conversion unit 211 may acquire several items 621, 622, and 623 as a conversion item in which the unfixed item 400 is converted by performing the item conversion processing several times when the unfixed item 400 is the general unfixed item 620.

In this case, in an example of FIG. 6B, the acquired first item 621, second item 622, and third item 623 are each determined to have item values less than a predetermined level by the item value determination unit 220 and colors 6210, 6220, and 6230 determined by the item color determination unit 230 are colors representing item values lower than a predetermined level.

That is, the one item 611 acquired when the unfixed item 400 is the exceptional unfixed item 610 may be determined to have a value higher than several items 621, 622, and 623 acquired when the unfixed item 400 is a general unfixed item 620, by the item value determination unit 220.

Hereinafter, to provide the item acquisition path R5 by fixing the item information on the unfixed item 400, the item information fixing unit 212 which may be included in the item acquisition unit 210 will be described.

The item information fixing unit 212 may perform the item acquisition procedure of selecting and fixing the specific item information in the unfixed item 400 by performing the item information fixing processing on the unfixed item 400 having the unfixed item information and acquiring the unfixed item 400 having the fixed specific item information as the item 300.

The item information fixing unit 212 may control the selection of the specific item information to be fixed in the unfixed item 400 so that the item value of the item 300 is determined to be less than the unfixed item purchase cost, is determined to be equal to be the unfixed item purchase cost, or is determined to exceed the unfixed item purchase cost, by referring to the auction house market price information on each item which is generated by the item auction unit 260 and is stored and managed as an example of the market price information by the item market price information management unit 250.

Meanwhile, as illustrated in FIG. 2, the server 100 for providing a game according to the exemplary embodiment of the present invention may further include an item use management unit 270 which confirms whether the specific character is previously included in a list of the used characters when the item use information on the item 300 is input by the user in the case in which the specific item information fixed in the item 300 includes the character information on the specific character by performing the item acquisition procedure and if it is confirmed that the specific character is not included in the list of the used characters, adds the specific character to the list of the used characters to perform character scout processing to enable the specific character to be used within a game and if it is confirmed that the specific character is previously included in the list of the used characters, performs character rearing processing changing the character information on the specific character which is previously included in the list of the used characters based on ability numerical information confirmed from the character information on the specific character included in the specific item information. That is, the acquired item 300 may be used as a player scout item or a player rearing item.

Hereinafter, a method for providing a game by the server 100 according to the exemplary embodiment of the present invention as described above will be briefly described with reference to FIG. 7.

Figure 7:
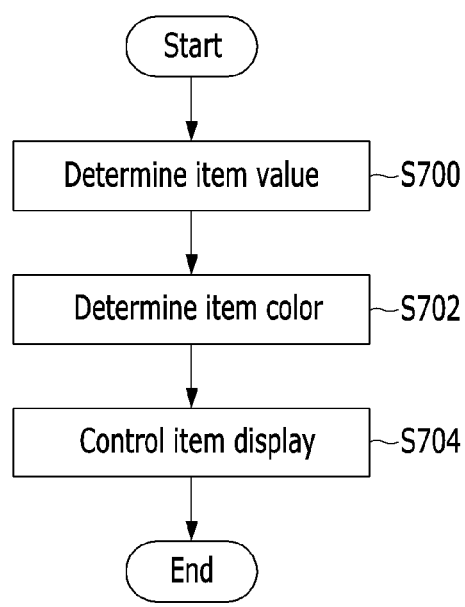
FIG. 7 is a flow chart of a method for providing a game by a server according to an exemplary embodiment of the present invention.

FIG. 7 is a flow chart of a method for providing a game by the server 100 according to the exemplary embodiment of the present invention.

Referring to FIG. 7, the method for providing a game by the server 100 according to the exemplary embodiment of the present invention includes determining the item value of the acquired item 300 (S700), determining the colors representing the determined item values (S702), controlling the display of the item 300 on the game screen depending on the determined colors (S704), and the like.

Hereinabove, the case in which in the game according to the exemplary embodiment of the present invention, the function of representing the variable value of the item 300 with the color depending on the market price information is provided by the server 100 except for the portion in which the input or the selection of the user is required has been described.

Hereinafter, the case in which the game according to the exemplary embodiment of the present invention is provided from the terminal will be described. In this case, the game according to the exemplary embodiment of the present invention including the function of representing the variable value of the item 300 with color depending on the market price information may be provided by the applications (game programs) which are installed in the terminal. That is, referring to FIGS. 2 to 7, all or a part of the functions provided by the above-mentioned server 100 may be provided by the applications which are installed in the terminal. Further, the storage and management, and the like of the information or data may also be performed by the server to which the terminal is connected.

The applications installed in the terminal may be downloaded and installed to the terminal by the application providing server such as the corresponding game server or an application store server and may be applications which are basically installed in the terminal without the installation request of the user.

Figure 8:
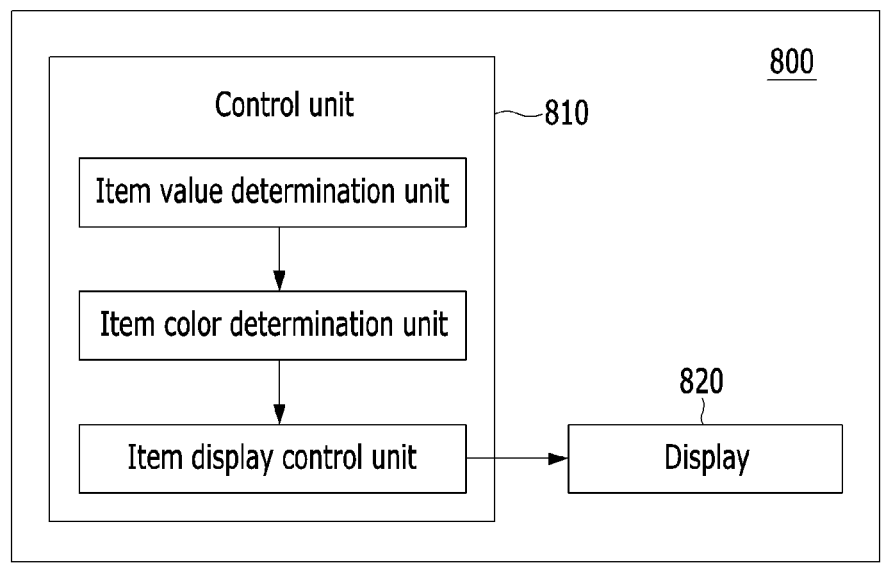
FIG. 8 is a block diagram of a terminal for providing a game according to an exemplary embodiment of the present invention.

FIG. 8 is a block diagram of a terminal 800 for providing a game according to an exemplary embodiment of the present invention.

Referring to FIG. 8, the terminal 800 for providing a game according to the exemplary embodiment of the present invention includes a control unit 810 which determines the item value of the acquired item 300, determines a color 3000 representing the determined item value, and controls the display of the item 300 on the game screen depending on the determined color 3000, a display 820 on which the game screen is output, and the like.

As illustrated in FIG. 8, the control unit 810 may include detailed components of an item value determination unit which determines the item value of the acquired item 300 depending on the market price information (stored in the terminal 800 or confirmed by the server) of the item 300 which may be updated at a predetermined period or in real time, an item color determination unit which determines the item grades from the determined item values and determines a color corresponding to the determined item grade as the color 3000 representing the determined item value, an item display control unit which controls the display of the item 300 on the game screen depending on the determined color 3000, and the like.

Figure 9:
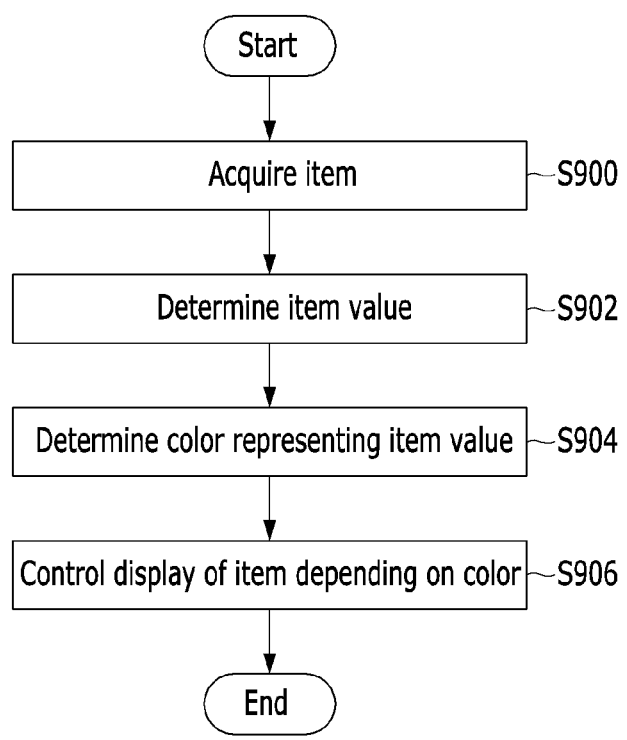
FIG. 9 is a flow chart of a method for providing a game by a terminal according to the exemplary embodiment of the present invention.

FIG. 9 is a flow chart of a method for providing a game by the terminal 800 according to the exemplary embodiment of the present invention.

Referring to FIG. 9, the method for providing a game by the terminal 800 according to the exemplary embodiment of the present invention includes acquiring the item 300 (S900), determining the item value of the item 300 (S902), determining the colors representing the determined item values (S904), controlling the display of the item 300 on the game screen depending on the determined colors (S906), and the like.

The method for providing a game according to the exemplary embodiment of the present invention as described above may be executed by the applications (including programs included in a platform, an operating system, or the like which is basically installed in the terminal 800) which is basically installed in the terminal 800 and may also be executed by the applications (i.e., programs) which are directly installed in the terminal 800 by the user via the application store server or the application providing server such as the web server associated with the applications or the corresponding services.

In this respect, the method for providing a game according to the exemplary embodiment of the present invention may be implemented by the applications (i.e., programs) which are basically installed or directly installed by the user in the terminal 800 and may be recorded in a computer readable recording medium of the terminal 800, and the like.

The programs implementing the method for providing a game according to the exemplary embodiment of the present invention executes the function of determining the item value of the acquired item 300 the function of determining color depending on the determined item value and the function of controlling the display of the item 300 on the game screen depending on the determined color.

The programs are recorded in the computer readable recording medium and are executed by the computer, such that the above-mentioned functions may be executed.

As described above, to allow the computer to execute the method for reading the programs recorded in the recording medium and providing the game implemented by the programs, the above-mentioned programs may include codes which are coded with computer languages such as C, C++, JAVA, machine language, and the like which may be read by a processor (CPU) of the computer.

The code may include a function code associated with a function of defining the above-mentioned functions and may also include an execution procedure related control code required to allow the processor of the computer to execute the above-mentioned functions as a predetermined procedure.

Further, the code may further include a memory reference related code indicating at which location (address number) of the memory inside or outside the computer additional information or media required to allow the processor of the computer to execute the above-mentioned functions are referenced.

Further, to allow the processor of the computer to execute the above-mentioned functions, when the processor needs to communicate with any other computers or servers, etc. at a remote location, the code may further include a communication related code about how the processor of the computer communicates with any other computers or servers at a remote location or what information or media the processor of the computer transmits and receives at the time of the communication, by using the communication module (for example, wired and/or wireless communication module) of the computer.

Further, a functional program for implementing the present invention, a code and a code segment associated therewith, and the like may be easily inferred or changed by programmers in the art to which the present invention pertains in consideration of a system environment of the computer which reads the recording medium and executes the program.

Hereinabove, examples of a computer readable recording medium recorded with programs as described above include a ROM, a RAM, a CD-ROM, a magnetic tape, a floppy disk, an optical media storage device, and the like.

Further, a computer readable recording medium recorded with programs as described above may be distributed to a computer system connected through a network and thus stores and executes a computer readable code by a distributed manner In this case, at least any one computer among a plurality of distributed computers may execute a part of the above-mentioned functions and transmit the executed results to at least one of other distributed computers and the computer receiving the result may also execute a part of the above-mentioned functions and provide the executed results to other distributed computers.

In particular, a computer readable recording medium recorded with applications which are programs for executing the method for providing a game according to the exemplary embodiment of the present invention may be a storage medium (for example, hard disk, and the like) included in an application store server or an application providing server such as a web server associated with applications or corresponding services, and the like, or an application providing server itself.

A computer which may read a recording medium recorded with applications which are programs for executing the method for providing a game according to the exemplary embodiment of the present invention may include not only general PCs such as a typical desktop and a laptop but also mobile terminals such as a smart phone, a tablet PC, personal digital assistants (PDAs), and a mobile communication terminal and is to be construed as all the computable devices.

When a computer which may read a recording medium recorded with applications which are programs for executing the method for providing a game according to the exemplary embodiment of the present invention is mobile terminals such as a smart phone, a tablet PC, a personal digital assistant (PDA), and a mobile communication terminal, the applications are downloaded from an application providing server to a general PC and thus may also be installed in the mobile terminal by a synchronization program.

Figure 10:
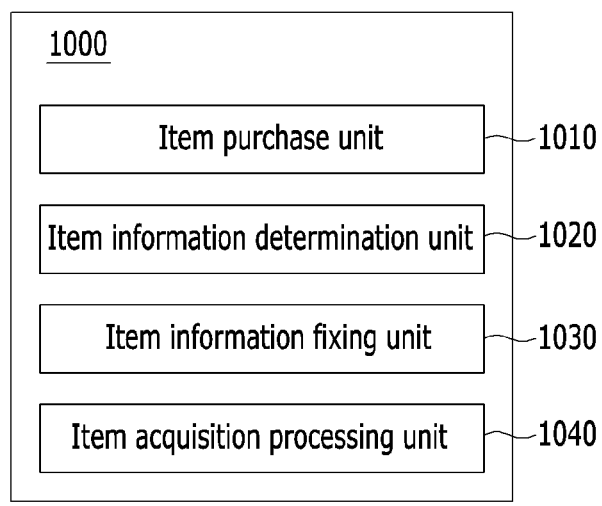
FIG. 10 is a block diagram of a server for providing a game according to another exemplary embodiment of the present invention.

FIG. 10 is a block diagram of a server 1000 for providing a game according to another exemplary embodiment of the present invention.

Referring to FIG. 10, the server 1000 for providing a game according to another exemplary embodiment of the present invention includes an item purchase unit 1010 which performs item purchase processing on the items having the unfixed item information depending on the a predetermined purchase price, an item information determination unit 1020 which determines the item information corresponding to one of a value less than the purchase price, the same value as the purchase price, and a value exceeding the purchase price, an item information fixing unit 1030 which fixes the determined item information as the item information on the items to make the items be used within the game, and an item acquisition processing unit 1040 which adds the item having the fixed item information to the list of the acquired items, and the like.

Figure 11:
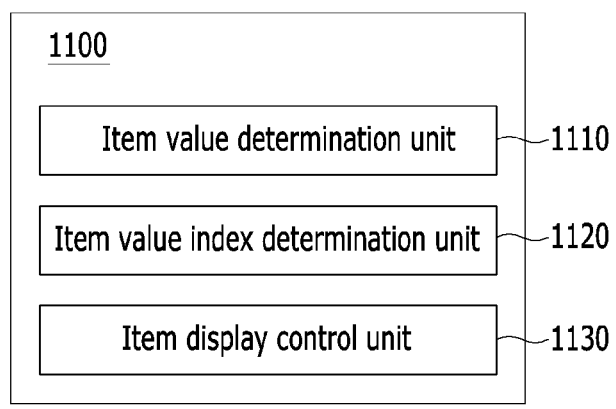
FIG. 11 is a block diagram of a server for providing a game according to another exemplary embodiment of the present invention.

FIG. 11 is a block diagram of a server 1100 for providing a game according to another exemplary embodiment of the present invention.

Referring to FIG. 11, the server 1100 for providing a game according to another exemplary embodiment of the present invention includes an item value determination unit 1110 which determines item values of items, an item value index determination unit 1120 which determines item value indexes representing the determined item values, and an item display control unit 1130 which controls a display of items on the game screen in response to the determined item value indexes, and the like.

The above-mentioned item value determination unit 1110 may determine item value indexes including at least one of colors, sizes, shapes, and the like which correspond to the item value ranges to which the determined item values belong, by referring to the corresponding information on at least one of the colors, the sizes, the shapes, and the like corresponding to each item value range As set forth above, according to the exemplary embodiments of the present invention, it is possible for the user to easily recognize the item values of the items when the items usable within a game are displayed on the game screen.

Further, according to the exemplary embodiments of the present invention, it is possible for the user to feel the curiosity and fun about whether the item having any fixed item information is obtained from the unfixed item, by providing the function of providing the unfixed item in which the item information is not fixed, not the fixed item in which the item information is fixed in advance and obtaining the item having the fixed item information from the unfixed item.

Hereinabove, although it has been mentioned that all components configuring the exemplary embodiment of the present invention described hereinabove are combined with each other as one component or are combined and operated with each other as one component, the present invention is not necessarily limited to the above-mentioned exemplary embodiment. That is, all the components may also be selectively combined and operated with each other as one or more component without departing from the scope of the present invention. In addition, although each of all the components may be implemented by one independent hardware, some or all of the respective components which are selectively combined with each other may be implemented by a computer program having a program module performing some or all of functions combined with each other in one or plural hardware. The codes and the code segments configuring the computer program may be easily inferred by a person having ordinary skill in the art to which the present invention pertains. The computer programs are stored in the computer readable media and are read and executed by the computer and may implement the exemplary embodiment of the present invention. As the storage medium of the computer programs, a magnetic recording medium, an optical recording medium, and the like may be used.

Hereinabove, although it has been mentioned that all components configuring the exemplary embodiment of the present invention described hereinabove are combined with each other as one component or are combined and operated with each other as one component, the present invention is not necessarily limited to the above-mentioned exemplary embodiment. That is, all the components may also be selectively combined and operated with each other as one or more component without departing from the scope of the present invention. In addition, although each of all the components may be implemented by one independent hardware, some or all of the respective components which are selectively combined with each other may be implemented by a computer program having a program module performing some or all of functions combined with each other in one or plural hardware. The codes and the code segments configuring the computer program may be easily inferred by a person having ordinary skill in the art to which the present invention pertains. The computer programs are stored in the computer readable media and are read and executed by the computer and may implement the exemplary embodiment of the present invention. As the storage medium of the computer programs, a magnetic recording medium, an optical recording medium, and the like may be used.

Further, it will be further understood that the terms "comprises" or "have" used in this specification may include the corresponding components unless explicitly described to the contrary and therefore, do not preclude other components but further include the components. In addition, unless defined otherwise in the detailed description, all the terms including technical and scientific terms have the same meaning as meanings generally understood by those skilled in the art to which the present invention pertains. Generally used terms such as terms defined in a dictionary should be interpreted as the same meanings as meanings within a context of the related art and should not be interpreted as ideally or excessively formal meanings unless clearly defined in the present specification.

The spirit of the present invention has been just exemplified. It will be appreciated by those skilled in the art that various modifications and alterations can be made without departing from the essential characteristics of the present invention. Accordingly, the exemplary embodiments disclosed in the present invention do not limit but describe the spirit of the present invention, and the scope of the present invention is not limited by the exemplary embodiments. The scope of the present invention should be interpreted by the following claims and it should be interpreted that all spirits equivalent to the following claims fall within the scope of the present invention.

The invention claimed is:

1. A server for providing a game over a network to a remote user terminal, the server comprising:
   an item value determination unit configured to determine an item value of an item;
   an item color determination unit configured to determine a color representing the determined item value;
   an item display control unit configured to control a display of the item on a game screen depending on the determined color;

an item acquisition unit configured to perform an item acquisition procedure to add the item to a list of acquired items in an item list storage unit, wherein the item acquisition unit comprises an item conversion unit, the item conversion unit configured to, in response to receiving a conversion request over the network from the remote user terminal:

select the item from a plurality of items, the selected item having fixed specific item information, and convert an unfixed item, which is purchased with a predetermined unfixed item purchase cost and has unfixed item information, to the selected item having fixed specific item information.

2. The server of claim 1, wherein: the item value determination unit confirms a market price information on the item when a determination event is generated and determines the confirmed market price information as the item value of the item, by referring to the market price information on each item which is updated at each predetermined period or updated in real time if the determination event for the item value of the item is generated.

3. The server of claim 2, further comprising:

an item market price information management unit configured to read an auction house market price information on each item at a predetermined period or in real time and store and manage the auction house market price information as the market price information.

4. The server of claim 3, further comprising:

an item auction unit configured to post an auction information on the item and generate the auction house price information depending on a received purchase asking price information.

5. The server of claim 1, wherein:

the item color determination unit determines an item value range to which the determined item value belongs among a plurality of item value ranges by referring to information on an item grade corresponding to each of the plurality of item value ranges and determines the item grade corresponding to the determined item value range as the item grade of the item, and determines a color corresponding to the determined item grade as a color representing the item value of the item by referring to an information on a color corresponding to each of the plurality of item grades.

6. The server of claim 1, wherein:

the item display control unit displays the entire region or a partial region of the item displayed on the game screen of the remote user terminal as the determined color to represent the item value of the item.

7. The server of claim 1, wherein:

the item conversion unit controls the selection of the item having fixed specific information by referring to an auction house market price information on each of the plurality of items so that the item value of the selected item is determined to be less than the unfixed item purchase cost, determined to be equal to the unfixed item purchase cost, or determined to exceed the unfixed item purchase cost.

8. The server of claim 1, wherein:

the item conversion unit detects the unfixed item as one of a general unfixed item and an exceptional unfixed item which are divided depending on a possible frequency of the item conversion processing and performs the item conversion processing depending on the detected result.

9. The server of claim 8, wherein:

the item conversion unit acquires several items as the item having fixed specific information to which the unfixed item is converted by performing the item conversion processing several times when the unfixed item is the general unfixed item, acquires only one item as the item having fixed specific information to which the unfixed item is converted by performing the item conversion processing once when the unfixed item is the exceptional unfixed item, wherein the one item acquired when the unfixed item is the exceptional unfixed item is determined to have a higher value than the several items acquired when the unfixed item is the general unfixed item, by the item value determination unit.

10. The server of claim 1, wherein:

the item acquisition unit further comprises an item reprocessing unit configured to delete at least one acquisition item from the list of the acquired item depending on reprocessing request information on the at least one acquired item included in the list of the acquired item and add the item having the fixed specific item information to the list of the acquired item by performing the item acquisition procedure acquiring the item.

11. The server of claim 1, wherein:

the item acquisition unit further comprises an item information fixing unit configured to perform the item acquisition procedure of fixing a specific item information in the unfixed item by performing an item information fixing processing on the unfixed item having the unfixed item information and acquiring a second unfixed item having the fixed specific item information as the selected item.

12. The server of claim 11, wherein:

the item information fixing unit controls the fixing of the specific item information in the unfixed item by referring to auction house market price information on each of the plurality of items so that the item value of the selected item is determined to be less than the unfixed item purchase cost, determined to be equal to the unfixed item purchase cost, or determined to exceed the unfixed item purchase cost.

13. The server of claim 1, wherein:

the item acquisition unit comprises at least one of an item purchase unit configured to perform an item acquisition procedure acquiring the item having the fixed specific item information depending on an item purchase procedure in an item shop and an item compensation unit configured to perform the item acquisition procedure acquiring the item having the fixed specific item information as compensation depending on a game result.

14. The server of claim 1, further comprising:

an item use management unit configured to confirm whether a specific character is previously included in a list of used characters by performing the item acquisition procedure when the item use information on the items is input in the case in which the specific item information fixed in the item includes the character information on the specific character, if it is confirmed that the specific character is not included in the list of the used characters, add the specific character to the list of the used characters to perform character scout processing to enable the specific character to be used within a game, and if it is confirmed that the specific character is previously included in the list of the used characters, perform character rearing processing changing the character information on the specific character which is previously included in the list of the used characters based on ability numerical information confirmed from the character information on the specific character included in the specific item information.

15. A method for providing a game over a network to a remote user terminal by a server, comprising:
   determining an item value of an item;
   determining a color representing the determined item value;
   controlling a display of the item on a game screen depending on the determined color;
   performing an item acquisition procedure to add the item to a list of acquired items in an item list storage unit;
   receiving, over the network, a conversion request from the remote user terminal;
   selecting the item from a plurality of items, the selected item having fixed specific item information; and
   converting an unfixed item, which is purchased with a predetermined unfixed item purchase cost and has unfixed item information, to the selected item having fixed specific item information.

16. A server for providing a game over a network to a remote user terminal, comprising:
   an item value determination unit configured to determine an item value of an item;
   an item value index determination unit configured to determine an item value index representing the determined item value;
   an item display control unit configured to control a display of the item on a game screen depending on the determined item value index; and
   an item acquisition unit configured to perform an item acquisition procedure to add the item to a list of acquired items in an item list storage unit, wherein the item acquisition unit comprises an item conversion unit, the item conversion unit configured to, in response to receiving a conversion request over the network from the remote user terminal:
      select the item from a plurality of items, the selected item having fixed specific item information, and
      convert an unfixed item, which is purchased with a predetermined unfixed item purchase cost and has unfixed item information, to the selected item having fixed specific item information.

17. The server of claim 16, wherein:
   the item value index determination unit
   determines the item value index including at least one of a color, a size, and a shape which correspond to the item value range to which the determined item value belongs, by referring to the corresponding information on at least one of the color, the size, and the shape corresponding to each item value range.

18. A terminal for providing a game, comprising:
   a control unit configured to determine an item value of an item, determine a color representing the determined item value, and control a display of the items on a game screen of the user terminal depending on the determined color;
   a display configured to output the game screen on the user terminal; and,
   an item acquisition unit configured to perform an item acquisition procedure to add the item to a list of acquired items in an item list storage unit, wherein the item acquisition unit comprises an item conversion unit, the item conversion unit configured to, in response to receiving a conversion request:
      select the item from a plurality of items, the selected item having fixed specific item information, and
      convert an unfixed item, which is purchased with a predetermined unfixed item purchase cost and has unfixed item information, to the selected item having fixed specific item information.

19. A method for providing a game by a terminal, comprising:
   determining an item value of an item;
   determining a color representing the determined item value;
   controlling a display of the item on a game screen depending on the determined color;
   performing an item acquisition procedure to add the item to a list of acquired items in an item list storage unit;
   receiving a conversion request;
   selecting the item from a plurality of items, the selected item having fixed specific item information; and
   converting an unfixed item, which is purchased with a predetermined unfixed item purchase cost and has unfixed item information, to the selected item having fixed specific item information.

20. A non-transitory computer readable recording medium recorded with a program for executing a computer-implemented method for providing a game over a network to a remote user terminal, wherein the program implements:
   a function of determining an item value of an item;
   a function of determining a color depending on the determined item value;
   a function of controlling a display of the item on a game screen depending on the determined color; and
   a function of performing an item acquisition procedure to add the item to a list of acquired items in an item list storage unit, wherein the item acquisition procedure comprises, in response to receiving a conversion request over the network from the remote user terminal:
      a function of selecting the item from a plurality of items, the selected item having fixed specific item information, and
      a function of converting an unfixed item, which is purchased with a predetermined unfixed item purchase cost and has unfixed item information, to the selected item having fixed specific item information.

* * * * *